Figure 1:
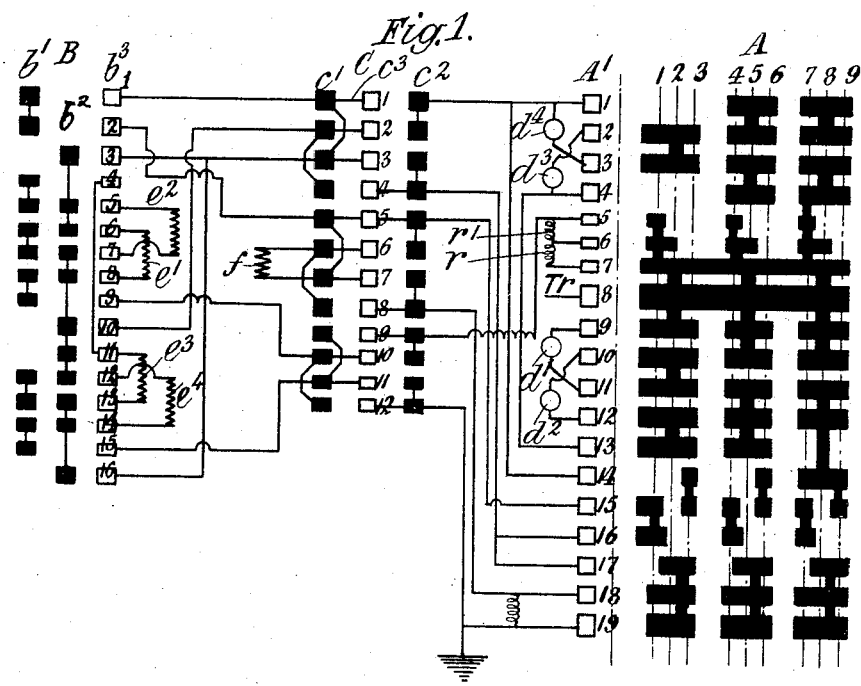

No. 767,350. PATENTED AUG. 9, 1904.
J. G. V. LANG.
METHOD OF REGULATING ELECTRIC MOTORS.
APPLICATION FILED APR. 19, 1904.
NO MODEL. 2 SHEETS—SHEET 1.

Witnesses:
M. F. Keating
G. Jackson

Inventor:
Johan Gustaf Viktor Lang
By his Attorney
Charles J. Kintner.

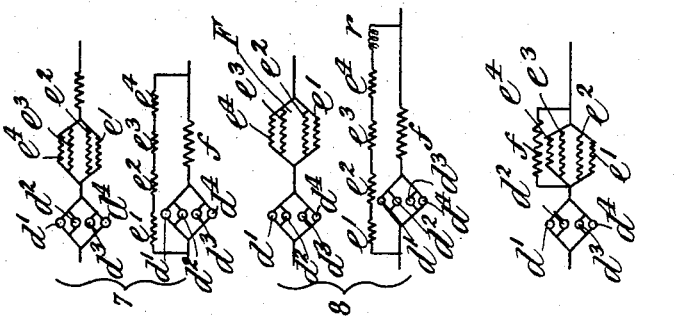
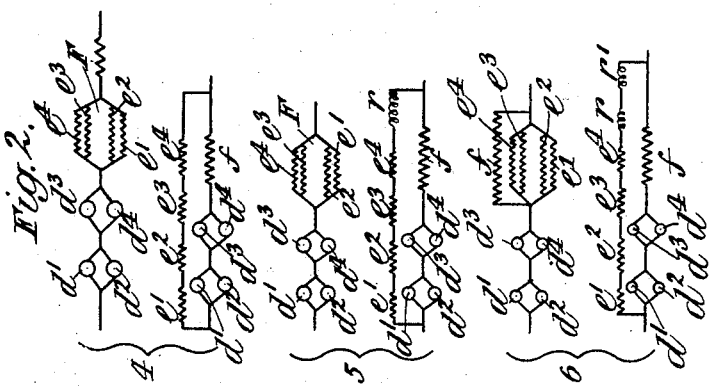
Fig. 2.
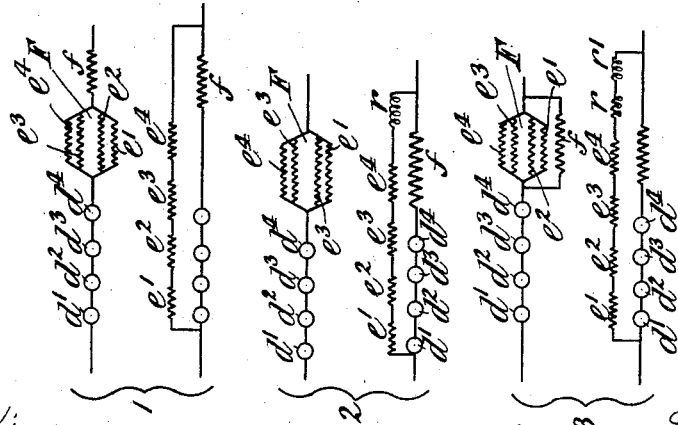

No. 767,350. Patented August 9, 1904.

UNITED STATES PATENT OFFICE.

JOHAN GUSTAF VIKTOR LANG, OF LONDON, ENGLAND, ASSIGNOR OF ONE-HALF TO EDWARD HIBBERD JOHNSON, OF LONDON, ENGLAND.

METHOD OF REGULATING ELECTRIC MOTORS.

SPECIFICATION forming part of Letters Patent No. 767,350, dated August 9, 1904.

Original application filed January 20, 1903, Serial No. 139,817. Divided and this application filed April 19, 1904. Serial No. 203,838. (No model.)

*To all whom it may concern:*

Be it known that I, JOHAN GUSTAF VIKTOR LANG, electrician, a subject of the King of Sweden and Norway, residing at 16ª Soho Square, London, England, have invented a new and useful Method of Regulating Electric Motors, of which the following is a specification.

This invention relates to an improved method of regulating electric motors, more particularly those of the kind commonly known as "regenerative" motors—*i. e.*, machines that can be utilized for braking purposes and then serve for regenerating or returning to the power-circuit in the form of electricity the energy (kinetic and potential) of the car-hoist or other vehicle to which the motors are applied. Regeneration by the motors has been accomplished in various ways, such as by providing said motors with simple shunt field-windings or an independent field excitation, by the reversal of the series field, or by a compounding of the shunt and series field-windings. The last-mentioned method has been found most appropriate for regenerating purposes; but to secure the best results with it a very strong shunt-field is required, which entails a sacrifice of some of the good properties of the series motor as regards acceleration and high efficiency at light loads.

It is the chief object of my invention to enable the good features of the series motor to be retained for the duty of accelerating and running and to still have the shunt characteristics that are essential for regenerative braking. To accomplish this object, I provide the motor with a powerful series field-winding strong enough to enable the motor to be efficiently used as an ordinary series motor, and I also provide said motor with a full shunt-winding to permit of the maximum efficiency being attained when the motor is acting as a regenerator.

In cases where the motor-space is limited, which is especially so in tram-cars, it would be undesirable to have to accommodate a motor having both a full shunt and a full series winding, nor would it be an economical use of valuable space to carry thereon a shunt-coil solely for the purpose of regenerative braking. Therefore I so arrange the windings of the motor that the copper of the shunt-coil can be used in both the shunt and the series windings, and I provide the controller with a suitable device which when said controller is turned in a forward direction (as when starting and propelling the car) causes the shunt-coil to be disconnected and its component spools to be reconnected up in parallel with each other, so as to constitute the series winding. When said controller is turned in a backward direction—as when stopping or when braking in coasting down a hill, for example—the said device causes the shunt-coil to be restored to its shunt condition. Hence it will be seen that the machine thus automatically becomes a simple series-wound motor when acting to propel the vehicle and a shunt or compound wound machine when acting to retard the vehicle and regenerate current.

By the aforesaid method of control I am able to effect a reduction in the starting resistance, to obtain higher accelerating efficiency, and to obtain higher running efficiency at intermediate speeds with light loads.

Another part of my invention has reference to the manipulation of the series field-turns to effect the required speed changes, for which purpose I employ in addition to the series turns derived from the paralleling of the shunt-coils, as aforesaid, other series turns, and I so arrange them as to obtain the variation of turns and resistances requisite to produce the field changes necessary to effect the desired changes of speed.

In order that my said invention may be clearly understood and readily carried into practice, I will describe the same more fully with reference to the accompanying drawings, in which—

Figure 1 is a diagrammatic view showing a development of the main controller-cylinder, the field-change cylinder, and the reversing-cylinder, together with the various connections. Fig. 2 is a collection of notch diagrams showing the various combinations of the motor-circuits when the controller-cylinder is turned from notch to notch in a forward or backward direction.

A represents the main controller-cylinder, and A' the fixed contacts with which it coöperates, said fixed contacts being numbered from 1 to 19.

B represents the field-change cylinder, and C the reversing-cylinder.

The two vertical rows of black squares $b'\ b^2$ of the cylinder B represent the movable contacts which come into play when the controller-cylinder is moved in a backward or forward direction, respectively. $b^3$ represents the fixed contacts with which these movable contacts coöperate, said fixed contacts being numbered from 1 to 16.

The two vertical rows of black squares $c'\ c^2$ of the cylinder C represent the contacts for effecting the movement of the car in a backward or forward direction, respectively, and $c^3$ represents the fixed contacts with which they coöperate, said fixed contacts being numbered from 1 to 12.

There are nine notches of the controller (represented by the numerals 1 to 9) arranged in three groups, one comprising 1 to 3, another 4 to 6, and the third 7 to 9. In the example illustrated there are supposed to be four motors, of which the circles $d'\ d^2\ d^3\ d^4$ represent the armatures, $e'$, $e^2$, $e^3$, and $e^4$ represent the shunt-windings, and $f$ represents the series windings.

F represents the general grouping of the shunt-coils in parallel with each other, so that they can act collectively as series windings.

$r$ and $r'$ represent resistances hereinafter referred to, and T$r$ represents the trolley connection.

In Fig. 2 the numerals 1 to 9 represent the nine conditions of the windings corresponding with the nine positions of the controller-cylinder, and in this figure the grouping of the windings shown in the upper half of each diagram represents that due to the forward direction of the controller, while the lower half represents that due to the backward direction of said controller. In this way the upper halves of all the figures show the successive steps in the groupings during the turning of the handle from the first to the last notch, while the lower halves represent the successive stages while turning the handle the opposite way, the change or switching over from one series of steps to the other being effected, as hereinafter described, by means of the field-change cylinder B, which is actuated whenever the direction of motion of the main controller-handle is changed. In other words, as long as the handle is moving forward the plates $b^2$ are in contact with the plates $b^3$, and in conjunction with the main cylinder-contacts bring about the groupings shown at the upper part of each of the notch diagrams constituting Fig. 2. The moment, however, the handle is turned backward the field-change cylinder is operated and its plates $b'$ take the place of the plates $b^2$, thereby transposing the groupings, so that those shown in the lower parts of the notch diagrams take place.

From an inspection of Fig. 2 it will be seen that in starting the armatures are all in series, while the coils $e'$ to $e^4$ are coupled in parallel with each other in a single group F, which as a whole is in series with the main series coil $f$. At the next notch the series coil $f$ is cut out, while at notch 3 it is thrown into parallel with the grouped coils F. At notch 4 the armature grouping has been changed to a two-in-series and two-in-parallel arrangement, and the field-coils have been changed back into the condition shown at notch 1. The armatures remaining the same, the field-coils then at notches 5 and 6 repeat the transitions indicated in notches 2 and 3. Finally, when the speed of the car has increased considerably notch 7 is reached, where the armatures are all in parallel with each other, and from notch 7 to notch 9 the same gradual change in the field grouping is effected as in notches 1 to 3 and 4 to 6. Assuming then that notch 9 is reached and the car then comes to a long run downhill, where the motor can be used as a dynamo to regenerate current, the controller-handle is naturally turned backward, and its first action, by means of a suitable device, is to actuate the field-change cylinder B, so that at notch 8 the coils $e'$ to $e^4$ are all in series with each other and with the resistance $r$, but constitute a true shunt-winding across the armature and series field-coil. At notch 7 the resistance $r$ is removed. At notch 6 the armatures are thrown into series parallel, and now the two resistances $r\ r'$ are brought into the shunt-field. Then resistance $r'$ is cut out, (notch 5,) and next (notch 4) the resistance $r$ is cut out. Analogous changes occur in going back from notch 3 to notch 1; but if at any time the motorman should again move the handle forward, as he would do when wishing to increase the speed of the car, then the field-change cylinder B would at once switch over, so as to bring about the necessary upper series grouping corresponding to the particular notch at which the handle happens to be.

The course taken by the electric current when the controller-handle is at the first notch and the car being accelerated in a forward direction is as follows: from the trolley connection T$r$ through contacts 8 and 9 of the fixed contacts A' to the armature $d'$, contacts 11 and 10, armature $d^2$, contacts 12 and 13, armature $d^3$, contacts 2 and 3, armature $d^4$, and thence to contacts 1 and 2 of the row of fixed contacts $c^3$ of the reversing-cylinder C. This row of contacts is supposed to be lying contiguous to the row of contacts $c^2$ as the car is traveling in a forward direction. From said contact 2 the current flows to contact 10 of the row of fixed contacts $b^3$ of the field-change cylinder B. This row of contacts is at this time supposed to be lying contiguous to the row of contacts $b^2$. At said contact 10 the current divides, one portion flowing along the contacts $b^2$ to contacts 8 7, coils $e'$ $e^2$, and contacts 6 5 to contact 3, the other portion of the current flowing in the opposite direction through said contacts $b^2$ and reaching contacts 11 12, coils $e^3$ $e^4$, and contacts 13 and 14 and contact 16. From the said contacts 3 and 16 the current flows and meets again in conductor F, whence it flows to contacts 3 and 4 of the contacts $c^3$ of the reversing-cylinder C. The current flows from this last-mentioned contact 4 to contact 16 of the contacts A' of the main controller-cylinder A. The current flows to contact 5 of the contacts $c^3$ of the reversing-cylinder C and to contact 6 of contacts $c^2$. Thence the current flows to coil $f$ and through it to contact 7. It then passes through contacts $c^2$ to contacts 8 and 18 of the contacts A', whence it passes to contact 19 and to earth.

The course taken by the current when the controller-handle is at the first notch, as aforesaid, and the car is being retarded is as follows, it being understood that in such case the row of contacts $c^2$ of the reversing-cylinder C will be contiguous to the fixed contacts $c^3$, as before, and that the row of contacts $b'$ of the field-change cylinder B will be contiguous to the fixed contacts $b^3$: Starting from the trolley connection Tr and contact 8 of the contacts A', the current flows to contact 9, armature $d'$, contacts 11 and 10, armature $d^2$, contacts 12 and 13, armature $d^3$, contacts 2 and 3, and armature $d^4$, thence to contact 1 of the contacts $c^3$, to contact 1 of the contacts $b^3$, and over the contacts $b'$ to contact 2 of the contact $b^3$, thence to contacts 5 and 6 of the contacts $c^3$, through coil $f$ to contact 7, thence through the contacts $c^2$ to contact 8, and thence to contact 18 of the contacts A' and to earth. At the same time current also passes from the trolley-contact 8 of the contacts A' to contact 5 and thence to contacts 9 and 10 of the contacts $c^3$. Thence the current flows to contact 9 of the contacts $b^3$, to contact 8, coil $e'$, contacts 6 and 7, coil $e^2$, contacts 5 and 4 to contact 11, coil $e^3$, contacts 13 and 12, coil $e^4$, contacts 14 and 15 to contact 11 of the contacts $c^3$, and thence to earth.

No claim is made hereinafter to the apparatus used in practicing the methods hereinbefore described and hereinafter claimed, as this feature constitutes the subject-matter of an original application from which the present application was divided, said original application bearing Serial No. 139,817, filed in the United States Patent Office on the 20th day of January, 1903.

What I claim, and desire to secure by Letters Patent of the United States, is—

1. A method of regulating regenerative electric motors which consists in imparting thereto a series characteristic when they are to act as motors for driving and accelerating, and in imparting thereto a shunt or compound characteristic when they are to act as regenerative brakes for retarding or stopping, substantially as described.

2. A method of regulating regenerative electric motors which consists in causing the field-windings to exercise a series excitation when the machines are to exert their driving and accelerating function, and in causing said windings to exercise a shunt or compound excitation when said machines are to exert their regenerative braking function, substantially as described.

In testimony whereof I have hereunto set my hand, in presence of two subscribing witnesses, this 26th day of March, 1904.

JOHAN GUSTAF VIKTOR LANG.

Witnesses:
 EDWARD H. JOHNSON,
 HENRY HASPER.